United States Patent
Moeller et al.

(10) Patent No.: US 12,529,356 B2
(45) Date of Patent: Jan. 20, 2026

(54) WIND TURBINE AND WIND FARM

(71) Applicant: Siemens Gamesa Renewable Energy A/S, Brande (DK)

(72) Inventors: Jesper Moeller, Esbjerg (DK); Jan Thisted, Tjele (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 0 days.

(21) Appl. No.: 18/681,911

(22) PCT Filed: Aug. 11, 2022

(86) PCT No.: PCT/EP2022/072535
§ 371 (c)(1),
(2) Date: Feb. 7, 2024

(87) PCT Pub. No.: WO2023/025596
PCT Pub. Date: Mar. 2, 2023

(65) Prior Publication Data
US 2024/0352920 A1    Oct. 24, 2024

(30) Foreign Application Priority Data

Aug. 24, 2021 (EP) .................................. 21192719

(51) Int. Cl.
*F03D 9/25* (2016.01)
*F03D 13/20* (2016.01)
(Continued)

(52) U.S. Cl.
CPC ............. *F03D 9/257* (2017.02); *F03D 13/20* (2016.05); *H02B 1/202* (2013.01); *H02K 7/1823* (2013.01); *F05B 2220/706* (2013.01)

(58) Field of Classification Search
CPC ......... F03D 9/247; F03D 13/20; H02B 1/202; H02K 7/1823; F05B 2220/706
See application file for complete search history.

(56) References Cited

U.S. PATENT DOCUMENTS

| | | | |
|---|---|---|---|
| RE41,073 E * | 1/2010 | Wobben | F03D 9/255 |
| | | | 290/55 |
| 8,212,411 B2 | 7/2012 | Thorburn et al. | |

(Continued)

FOREIGN PATENT DOCUMENTS

| | | |
|---|---|---|
| CN | 111 653 970 A | 9/2020 |
| EP | 2 863 053 A1 | 4/2015 |

(Continued)

OTHER PUBLICATIONS

International Search Report & Written Opinion for PCT/EP2022/072535 mailed on Nov. 15, 2022.

*Primary Examiner* — Tulsidas C Patel
*Assistant Examiner* — Thomas K Quigley
(74) *Attorney, Agent, or Firm* — Schmeiser, Olsen & Watts, LLP

(57) ABSTRACT

A wind turbine is provided including: a power production component including at least a generator; an electric assembly and at least one first further wind turbine to an electric export cable, which is connectable or connected to a power grid, such that the electric assembly configures the wind turbine as a booster turbine, wherein the electric assembly comprises: a switchgear operated on a first lower voltage level; a transformer for transforming, from a primary side of the transformer, and a second higher voltage level input and/or output interface, located at the secondary side of the transformer and operating on the second higher voltage level, for providing an interconnection link to a second further wind turbine that is configured as a booster turbine and is arranged to receive and/or provide power via the interconnection link on the second higher voltage level.

18 Claims, 10 Drawing Sheets

(51) Int. Cl.
*H02B 1/20* (2006.01)
*H02K 7/18* (2006.01)

(56) References Cited

U.S. PATENT DOCUMENTS

| | | | |
|---|---|---|---|
| 8,987,930 B2* | 3/2015 | Matzen | H02P 9/10 |
| | | | 290/44 |
| 9,377,009 B2 | 6/2016 | Moeller et al. | |
| 9,638,172 B2* | 5/2017 | Nielsen | F03D 9/257 |
| 10,738,431 B2* | 8/2020 | Dallinger | E02B 17/0004 |
| 10,972,029 B2* | 4/2021 | Busker | H02J 3/46 |
| 11,286,903 B2* | 3/2022 | Brogan | F03D 7/048 |
| 11,303,101 B2* | 4/2022 | Broy | H02J 3/381 |
| 11,415,114 B2* | 8/2022 | Soerensen | H02G 1/088 |
| 11,725,634 B2* | 8/2023 | Hansen | F03D 13/10 |
| | | | 290/44 |
| 2010/0196100 A1* | 8/2010 | Soe-Jensen | H02G 1/10 |
| | | | 405/169 |
| 2013/0175801 A1* | 7/2013 | Matzen | H02P 9/10 |
| | | | 290/44 |
| 2015/0108764 A1* | 4/2015 | Moeller | F03D 80/00 |
| | | | 290/55 |
| 2015/0152850 A1* | 6/2015 | Nielsen | F03D 80/82 |
| | | | 307/85 |
| 2020/0370537 A1* | 11/2020 | Hospers | F03D 9/257 |
| 2020/0400120 A1* | 12/2020 | Brogan | H02J 11/00 |

FOREIGN PATENT DOCUMENTS

| | | |
|---|---|---|
| WO | 2009/003508 A1 | 1/2009 |
| WO | 2019137639 A1 | 7/2019 |

\* cited by examiner

WIND TURBINE AND WIND FARM

CROSS-REFERENCE TO RELATED APPLICATIONS

This application claims priority to PCT Application No. PCT/EP2022/072535, having a filing date of Aug. 11, 2022, which claims priority to EP application Ser. No. 21192719.9, having a filing date of Aug. 24, 2021, the entire contents both of which are hereby incorporated by reference.

FIELD OF TECHNOLOGY

The following relates to a wind turbine used in a wind farm to provide power from the wind farm to a grid. The following further concerns a wind farm.

BACKGROUND

The following relates particularly to offshore wind farms.

In offshore windfarms, equipment related to the connection to the grid, i.e., high voltage switching, compensation, grid forming for transformation equipment, bus bars for the connection of different strings of wind turbines, is usually placed on a separate substation and the substation is placed on a separate foundation.

The current practice of using separate bespoke foundations for such substations is expensive and leads to excessive cost and planning issues when having to plan a special design, construction, and installation process for substation equipment.

Furthermore, in most cases it will not be possible to use the same installation vessel fleet for wind turbine or wind turbine foundation installation for the installation of a substation. It will consequently be necessary to mobilize and de-mobilize special lifting vessels with higher lifting capacity. These vessels are in a hugely different cost range so there is a large saving potential if this can be avoided.

A wind farm may have a hierarchical setup, in which subsets of wind turbines are grouped in a string of wind turbines and a first one in such a string of wind turbines would provide the overall power from the turbines in that string to an HVAC (High Voltage Alternating Current) substation. Such an HVAC substation may get connected to several of such strings of wind turbines.

Another problem with the HVAC (High Voltage Alternating Current) substations is that there is a limit to how many incoming feeders (cables between the substation and the first wind turbine in each string of turbines) can be catered for, especially on the cable routing side. It can be difficult to find space on the seabed around the foundation and to find space on the foundation for the many lower voltage connections from the rest of the wind farm.

EP 2 863 053 A1 discloses a design of such a first wind turbine in a string of turbines, in which functionality of the substation is moved to this first wind turbine. This turbine can be called a booster turbine.

The booster turbine or AC booster turbine (AC: alternating current) can be defined as a wind turbine with high voltage equipment, e.g., transformer, HV switchgear (HV: high voltage), HV busbar and/or HV reactive compensation equipment placed on an external platform linked to the booster wind turbine and supported by the wind turbine foundation.

SUMMARY

It is an aspect of embodiments of the present invention to avoid some of the above-mentioned problems.

Embodiments of the present invention seek to mitigate these drawbacks.

Based on the previous patent publication EP 2 863 053 A1, which is incorporated herein by reference, a new concept for an AC (AC: alternating current) booster turbine (wind turbine including at least a transformer from the first to the second voltage level for the power of both the power production component of the wind turbine and the at least one first further wind turbine, high voltage equipment, e.g., transformer, HV switchgear, HV busbar and or HV reactive compensation equipment placed on an external platform) is provided to reduce a classical HVAC substation to two or more AC booster turbines with a bare minimum of equipment. The implementation of this idea is utilizing the wind turbine's foundation and adding only minor weight on the main structure, to transform directly up to grid export voltage directly at the two or more booster turbines. That is, in particular, the wind turbine may comprise a wind turbine foundation. At least two of these wind turbines interconnect using the interconnection link. Hence, a common export cable to the power grid can be used for the group of booster turbines interconnected in this manner. A separate substation then is not needed.

In case of a deployment on a monopile, the monopile may be used as a J-tube for array cables and/or to deploy external J-tubes for export cables. J-tubes are curved components to guide cables through its hollow inner part. In other words, the wind turbine foundation may comprise a monopile, wherein at least one J-tube for cables connectable to the electrical assembly are provided as a part of and/or in and/or at the monopile. The monopile may provide integrated J-tubes, for example J-shaped channels, and/or may have J-tube installed to it.

Generally, apart from a monopile construction, the concept according to the embodiments of the invention is also suitable for other types of wind turbine foundations, for example for jacket applications, that is, wind turbine foundations using jacket structures, jacket substructures and/or jacket platforms, as well as for any floating foundation type.

The proposed new concept will also be able to cater for the placement of various kinds of compensation equipment on the wind turbine foundation. With this solution an HVAC substation can be completely omitted and there will be no need for a separate bespoke foundation for placing electrical equipment.

In accordance with embodiments of the invention there is provided a wind turbine—a booster turbine (which may also be called a host turbine)—comprising:

- a power production component comprising at least a generator of the wind turbine, and
- an electric assembly for electrically connecting the power production component and at least one first further wind turbine to an electric export cable, which is an electric subsea cable and is connectable or connected to a power grid, wherein the electric assembly configures the wind turbine as a booster turbine.

The electric assembly in turn comprises:

- a switchgear operated on a first lower voltage level for switching and collecting input power from the power production component and/or from the at least one first further wind turbine, providing collective power on a first lower voltage level;
- a transformer for transforming, from a primary side of a transformer, the collective power from the switchgear to a second higher voltage level of the export cable connected to a secondary side of the transformer; and a second higher voltage level input and/or output interface, located at the secondary side of the transformer and operating on the second higher voltage level, for providing an interconnection link to a second further wind turbine that is configured as a booster turbine and is arranged to receive and/or provide power via the interconnection link on the second higher voltage level.

In an embodiment, the power production component further comprises a transformer assembly to step up a generator voltage of the generator of the wind turbine to the first lower voltage level.

The embodiments of the invention described herein comprises a second higher voltage level input and/or output interface, which may include a high voltage busbar, e.g., 220 kV or 275 kV, on the booster turbine. The high voltage busbar will allow that several booster turbines (also: WTG, standing for Wind Turbine Generators), two or more, to connect on high voltage (e.g., 220 kV) level.

There is a direct interconnection link (interconnection power link) between two or more booster turbines. One of the booster turbines may then feed power to the other booster turbines, the latter then providing a direct export of power to a grid connection point, usually located onshore (or, in some embodiments, offshore, for example on an offshore HVAC converter station). In other words, not every booster turbine in a wind park requires a direct connection to the export cable, such that an indirect connection to the export cable via at least one second further wind turbine, which is configured as a booster turbine, (and its second higher voltage level input and/or output interface, in particular high voltage busbar) may result.

Thereby no separate offshore substation is needed as the voltage is already on the right level for export connection and the right number of offshore booster turbines can be connected on HV (High Voltage), that is second higher voltage level to match the capacity of each export cable.

The present solution is not an integration of a substation into one of the wind turbines, as the equipment of a substation for a complete wind farm cannot be brought to one of the wind turbines, due to the weight, due to the cable sizes, or due to the footprint and other reasons.

The solution can, as further explained below with respect to the wind farm according to embodiments of the invention, also split the lower HV, that is the first lower voltage level connections ("lower" in respect of voltage level, for example, but not limited to below: 100 kV or below: 150 kV) from other, that is first further wind turbines up into smaller groups on multiple booster turbines and thereby minimize the congestion of cables and J-tubes (=J-shaped pipe to pull in the cables) around the foundation and make it easier to find space for J-tubes from the seabed and up to the equipment level.

A main idea of the present solution is to utilize the booster turbine's foundation load capacity to place HVAC equipment or DC (Direct Current) equipment or HVDC equipment and thereby reduce the investment costs of foundation capacity in terms of both weight and space.

In addition, it will minimize the cost for installation of electrical equipment since the additional HV power equipment of the booster turbines can be designed so no parts heavier than the nacelle need to be lifted. This means that already available crane vessels can be used for transformer installation. For example, instead of connecting 100 wind turbines via a substation a booster turbine may be designed and configured to only connect up to 10 or up to 15, or up to 20 wind turbines, therefore reducing the weight of the HV power equipment in the electric assembly compared to the substation. The power at the second voltage level is then connected via the interconnection link to supply the output of multiple booster turbines to a matching export cable.

An important element of the embodiments of the invention is thus that one or more groups of wind turbines at the second voltage level (e.g., at 132 kV, 220 kV or 275 kV level) can be connected to one another. In the shown proposal there is an interconnection link at the highest, that is second, voltage level between a pair of booster turbines or a higher number of booster turbines in order to ensure sufficient cable transfer capacity.

As part of the power production component, the wind turbine may also comprise a transformer assembly (converter) stepping up the voltage from the generator voltage to the array system voltage, that is, the first lower voltage level.

In an embodiment, the switch gear may be configured to have up to three or up to four first lower voltage level input interfaces for connecting the at least one first further wind turbine. In particular, using multiple interconnected booster turbines per export cable allows to assign a lesser number of first further wind turbines to each of the booster turbines. Hence here, but also generally, since the first further wind turbines may be distributed to a larger number of booster turbines, two major advantages result.

In a first advantage, a smaller number of first further wind turbines have to be connected to a certain booster turbine, such that less input interfaces to receive the power generated by the first further wind turbines are required. In particular, the number of first lower voltage level input interfaces may be reduced to three or four, such that, for example, up to three or up to four strings of first further wind turbines can be connected to the switch gear on the first lower voltage level, for example 66 kV or 132 kV. As a consequence, at each booster turbine, less cables have to be handled. In particular, only up to three or up to four incoming first lower voltage level cables from strings of first further wind turbines or even single first further wind turbines have to be guided to the switch gear and connected, such that less problems regarding, for example, the placement of J-tubes and generally less problems regarding space for the cables results. The required effort is strongly reduced.

In a second advantage, since less first further wind turbines are connected to each booster turbine, the components of the electric assembly are less complicated, cheaper and have less weight. This allows to implement all components of a substation at the respective booster turbines, since their foundations are not overloaded. In other words, by distributing the components of a substation onto multiple booster turbines, which are at least partly interconnected, no modifications regarding the load-carrying ability of the foundations of the wind turbines is necessary, while, on the other hand, a separate substation with a different foundation can be omitted.

In particular, each first lower voltage level input interface may comprise an input capacity for connecting a predefined number of first further wind turbines to the input interface. When connecting first further wind turbines as a string, the requirements of the cables connecting them increase the closer to the booster turbine and hence the input interface one comes. In other words, the final cable connecting the closest first further wind turbine of a string to the booster turbine has to be designed to carry the collective power of all wind turbines in the string, which is also true for the respective first lower voltage level input interface of the booster turbine. In other words, the number of first further wind turbines connectable to the wind turbine configured as booster turbine cannot only be limited by the number of respective input interfaces, but also by the number of first further wind turbines in a string connectable to the respective input interfaces. For example, less than or equal to 50 further first wind turbines may be connectable to each input interface, less than or equal to 10 first further wind turbines, or, in some embodiments, even less than or equal to 5 first further wind turbines. This may, in particular, depend on their respective power ratings.

As already noted above, by limiting the number of first further wind turbines connectable at the lower voltage level side to the booster turbines, not only can their design be simplified, but also the remaining electric assembly can be simplified and designed in a lightweight manner, such that the foundation of the booster turbine can carry its additional weight.

As already mentioned, the wind turbine may further comprise a wind turbine foundation carrying the electric assembly. In this context, the wind turbine foundation may comprise, for example, a monopile. Here, at least one J-tube for cables connectable to the electric assembly may be provided as a part of and/or in and/or on the monopile. In particular in combination with the reduced number of first lower voltage level input interfaces, the monopile provides enough room to handle all the incoming and/or outgoing cables, in particular also comprising cables for realizing interconnection links and/or the export cable. For example, the J-tube may be integral to the monopile, for example as channels extending through the monopile. They may also be additionally mounted to the monopile.

Generally said, at least a part of the electric assembly, in particular the transformer, may be provided on a platform mounted to the monopile and/or a transition piece and/or a tower of the wind turbine, and/or at least a part of the electric assembly, in particular the switch gear, may be provided in an inner chamber of the monopile and/or of the transition piece and/or of the wind turbine tower.

In a an embodiment, the tower of the wind turbine and at least one platform of the wind turbine configured as booster turbine are mounted to the monopile via a so-called transition piece. Such a transition piece may comprise an inner chamber, for example such that cables to the seabed, in particular guided by J-tubes, lead to this inner chamber, which is particularly suitable for placing the switch gear of the electric assembly. From the switch gear, links to the transformer provided on a platform mounted to the transition piece and/or tower and/or the monopile may be provided. On the platform, the transformer and optionally further components, for example the second higher voltage level input and/or output interface, may be provided in at least one protective housing. This configuration is, however, exemplary and other configurations, for example like described in the cited EP 2 863 053 A1, may be used, as well as other foundation types, as already discussed above.

Generally said, the electric assembly may comprise further components. In particular, the electric assembly may further comprise compensation equipment at the second higher voltage level side of the electrical assembly. Such compensation equipment, which is used for reactive power compensation as known in the conventional art, could optionally be provided at substations in the state of the conventional art, but can now also be provided at the booster turbines themselves, in particular since the functionality can be split up to multiple booster turbines which are interconnected by respective interconnection links. Furthermore, the electric assembly may further comprise at least one surge arrester and/or at least one earthing component connected between the secondary side of the transformer and the second higher voltage level input and/or output interface. While a surge arrester protects electrical equipment from over-voltage, externally or internally caused transients, earthing components may, for example, form a corresponding grounding system.

A large number of different combinations of first lower voltage levels and second higher voltage levels are conceivable. For example, the first lower voltage level may be 66 kV and the second higher voltage level may be 132 kV or 220 kV or 275 kV; or the first lower voltage level may be 132 kV and the second higher voltage level may be 220 kV or 275 kV. However, other voltage levels and combinations can also be applied.

Embodiments of the invention further concern a wind farm, comprising at least two wind turbines configured as booster turbines according to embodiments of the invention and multiple first further wind turbines. In particular, each of the at least two wind turbines configured as booster turbines of the wind farm according to embodiments of the invention may comprise:

a power production component comprising at least a generator of the wind turbine and, also a transformer assembly;

an electric assembly for electrically connecting the power production component and at least one of the first further wind turbines to an electric export cable, which is connectable or connected to a power grid, wherein the electric assembly comprises;

a switch gear operated on a first lower voltage level for switching and collecting input power from the power production component and/or from the at least one connected first further wind turbine, providing collective power on a first lower voltage level;

a transformer for transforming, from a primary side of a transformer, the collective power from the switch gear to a second higher voltage level of the export cable connected to a secondary side of the transformer; and a second higher voltage level input and/or output interface, located at the secondary side of the transformer and operating on the second higher voltage level, for providing an interconnection link to at least one further booster turbine (that is, second further wind turbine that is configured as a booster turbine from the view of this wind turbine), wherein the at least one further booster turbine (second further wind turbine) is arranged to receive and/or provide power via the interconnection link on the second higher voltage level.

All remarks regarding the wind turbine according to embodiments of the invention can be analogously applied to the wind farm according to embodiments of the invention, such that the same advantages result.

In particular, since a fewer number of first further wind turbines need to be connected to each booster turbine while still utilizing the full capacity of the export cables by interconnecting booster turbines, desired association of first further wind turbines to booster turbines can be achieved in a wind farm according to embodiments of the invention. Substations are, however, not required, since all respective components can be distributed to the multitude of booster turbines, carried by the respective foundations.

In particular, more than one export cable may be used. In such a case, all wind turbines of the wind farm may be divided into multiple sub-clusters, such that the booster turbines of each sub-cluster are interconnected by corresponding interconnection links and connected to a common export cable. Hence, a number of wind turbines matching the capacity of each export cable may be assigned to the export cable and connected via a certain number of booster turbines. For example, two to six or even more booster turbines may connect to each export cable. In this context, but also generally, at least one of the export cables may comprise export cable compensation equipment along its course, in particular, if a certain length of the export cable, for example 100 km, is exceeded. The compensation equipment in particular serves reactive power compensation.

Furthermore, at least two of the export cables may be directed to different power grid connection points. In an embodiment, such export cables may also have different lengths, such that at least one export cable may be provided with export cable compensation equipment along its course.

In an embodiment, for each subgroup of first further wind turbines connected to a common booster turbine, the first further wind turbines may be split into multiple strings of first further wind turbines connected on the first lower voltage level, wherein each string comprises less than or equal to a predefined maximum number of first further wind turbines and is connected to a respective first lower voltage level input interface of the respective booster turbine. In particular, since, to allow using the foundation of the booster turbine to additionally carry the electric assembly, hence components before housed in substations, the number of first further wind turbines to be connected to a respective booster turbine may be limited, for example by providing only up to three or up to four first lower voltage level input interfaces at the switch gear and designing these input interfaces such that only a certain maximum number of first further wind turbines, in particular of a string, are connectable. Here, simpler, cheaper and more lightweight cables may be used and, by limiting the number of respective input interfaces, the number of incoming cables can also be reduced.

In summary, a wind farm structure is provided in which the capacity of export cables can be optimally utilized without requiring any substation, since the functionality of the substations is distributed into the electric assemblies of the booster turbines and can be supported by the respective foundations. The enabling main idea of this concept is to interconnect booster turbines on the second higher voltage level, such that they can be connected to a single, common export cable.

It has to be noted that embodiments of the invention have been described with reference to different subject matters. In particular, some embodiments have been described with reference to apparatus type claims whereas other embodiments have been described with reference to method type claims. However, a person skilled in the conventional art will gather from the above and the following description that, unless otherwise notified, in addition to any combination of features belonging to one type of subject matter also any combination between features relating to different subject matters, in particular between features of the apparatus type claims and features of the method type claims is considered as to be disclosed with this application.

The aspects defined above and further aspects of embodiments of the present invention are apparent from the examples of embodiment to be described hereinafter and are explained with reference to the examples of embodiment.

BRIEF DESCRIPTION

Some of the embodiments will be described in detail, with references to the following Figures, wherein like designations denote like members, wherein.

DETAILED DESCRIPTION

Figure 1:
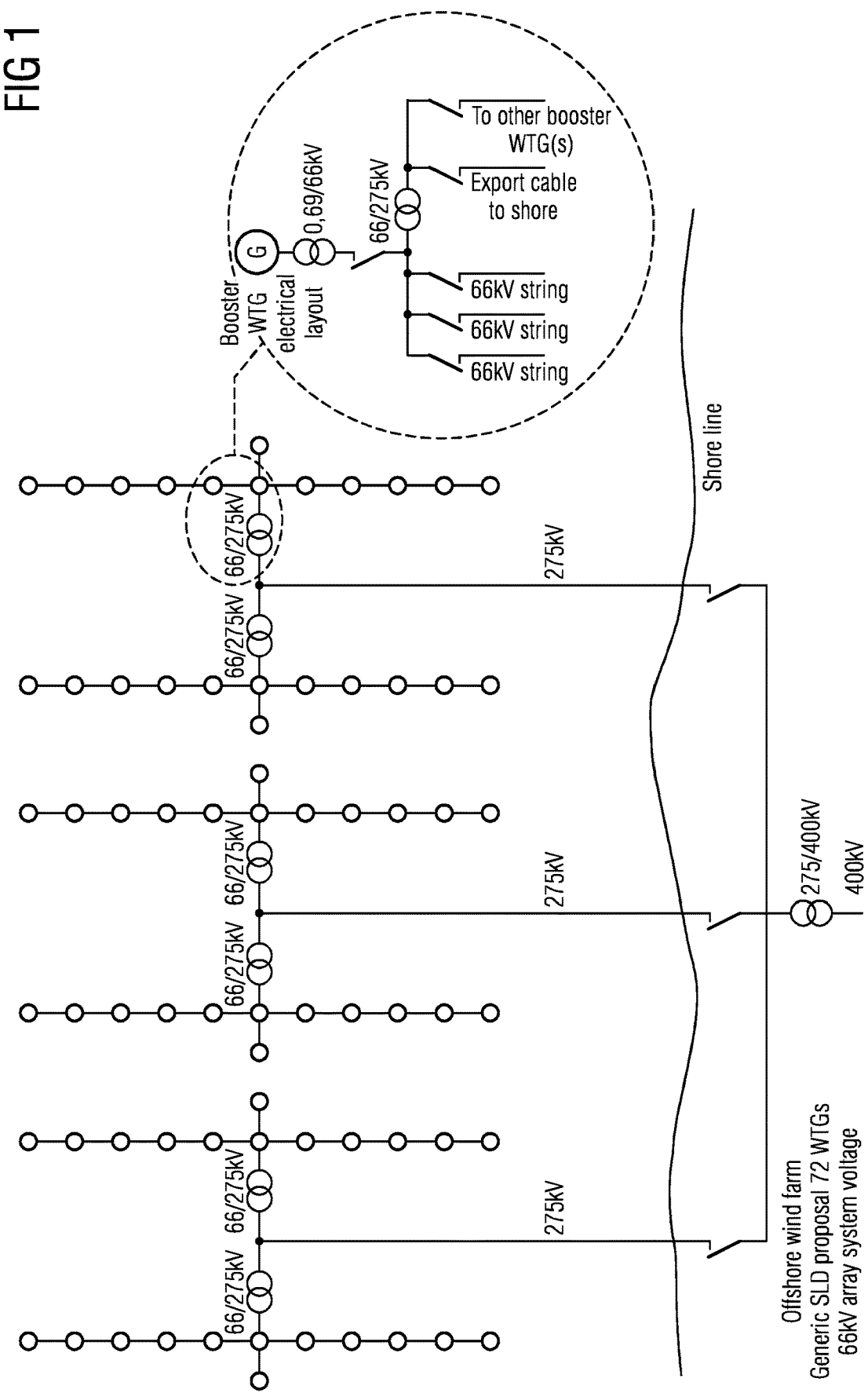
FIG. 1 shows schematically an example of a wind farm with 72 wind turbines and six booster turbines according to embodiments of the invention.

A booster WTG electrical single line main current diagram is shown on the drawing of FIG. 1. Details are shown in the circle in FIG. 1.

Referring now to FIG. 1, more groups of wind turbines at HV level, e.g. at 132 kV, 220 kV or 275 kV level, are connected. In this embodiment, there is provided an interconnection link between multiple booster turbines at the highest, that is second higher, voltage level in order to ensure sufficient export cable transfer capacity utilization.

In an example consistent with FIG. 1, there might be a limitation of five turbines per string, so that the power can stay below a specific power threshold level. This allows the cable diameter for the cables from the other, that is first further, wind turbines in the string of wind turbines to the booster turbine to not exceed a wanted maximum size. Larger cables are generally more difficult to handle so embodiments of the invention allow to stay with smaller cable diameters.

The example of FIG. 1 shows the idea to connect twelve wind turbines as one subgroup of wind turbines in the wind farm, one of which is the booster turbine. To stay at a lower first voltage level (e.g., 66 kV), the eleven first further wind turbines are grouped such that no string in each subgroup has more than five first further wind turbines. In the example given, the first further wind turbines are split to 5+5+1 wind turbines in the three strings (each at 66 kV level). Alternatively, other distributions are possible (e.g., 4+4+3 in three strings), but not going above five turbines in a string for the present example. These numbers are examples only.

As an example, FIG. 1 additionally shows more than one HV link implemented as an export cable to shore for the connection to the power grid, so not all wind turbines of the wind farm are connected to a single wind farm power line, that is, export cable. The wind farm is therefore split in separate sub clusters.

FIG. 1 also shows the design in the booster wind turbines with respect to the electrical layout. It might have for example connectors, that is, first lower voltage level input interface, for three strings, for example with 66 kV as the first voltage level. It may have, as part of the second higher voltage level input and/or output interface, a connector to an export cable to shore, e.g., on 275 kV level as higher second voltage level. Additionally, the booster turbine may have, as part of the second higher voltage level input and/or output interface, a connector for an interconnection to at least one other booster turbine for another set of strings of wind turbines, forming an additional subgroup. This interconnection link is on the second higher voltage level, for example on the 275 kV level. In consequence only five cables need to be routed in and out of the booster turbine, three of them (to the three strings of turbines) on the first lower voltage level and two of them (export to the power grid and the interconnection link) on the second higher voltage level.

As can also be seen in FIG. 1, in the circle, the booster turbine itself generates power on the lower first voltage level.

The booster turbine has switchgear in the form of switching equipment and/or a bus bar. It also comprises an additional transformer from the first lower voltage level to the second higher voltage level, here exemplarily for conversion from 66 kV to 275 kV.

Figure 2:
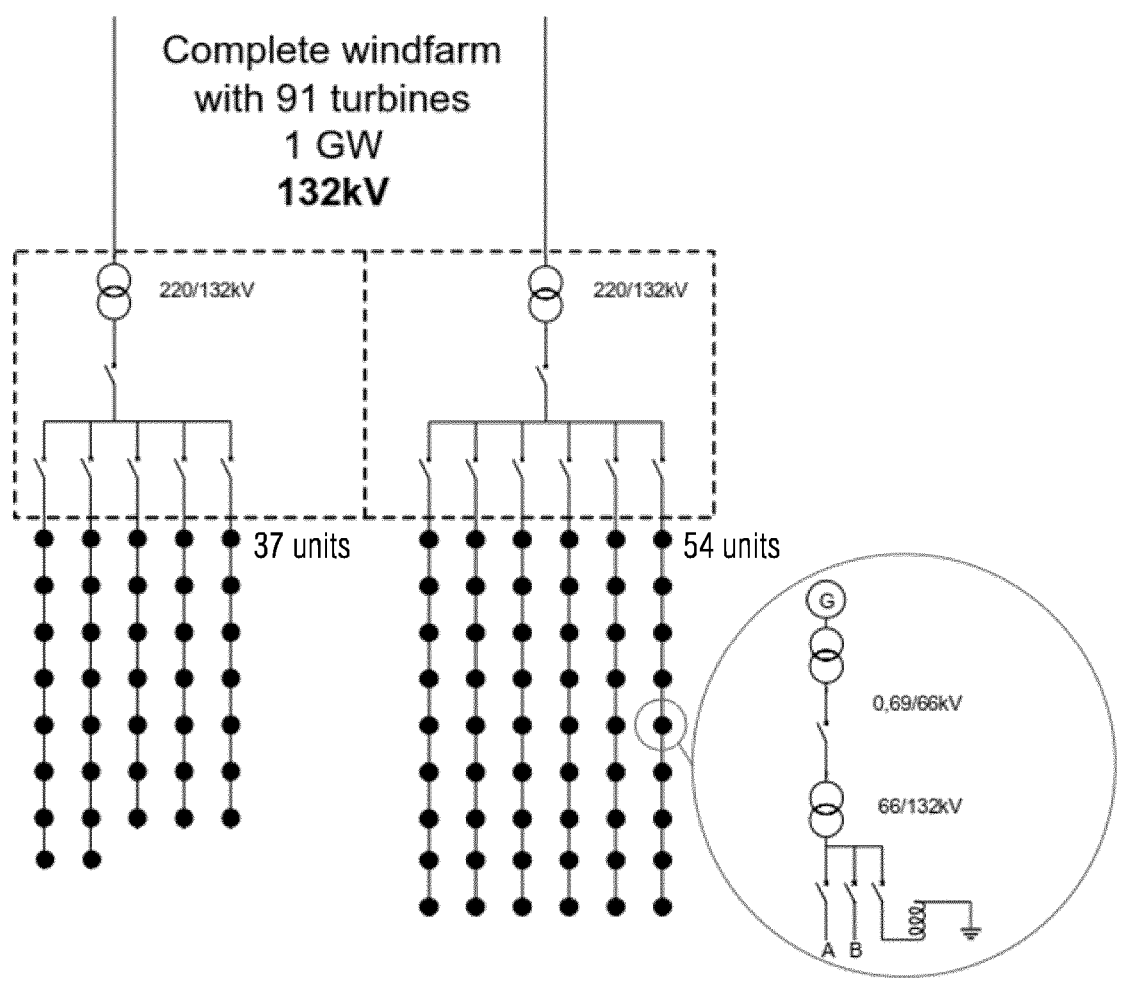
FIG. 2 shows a design not covered by embodiments of the invention as it has a substation, wherein each intermediate turbine transforms right away to a higher voltage level.
Figure 3:
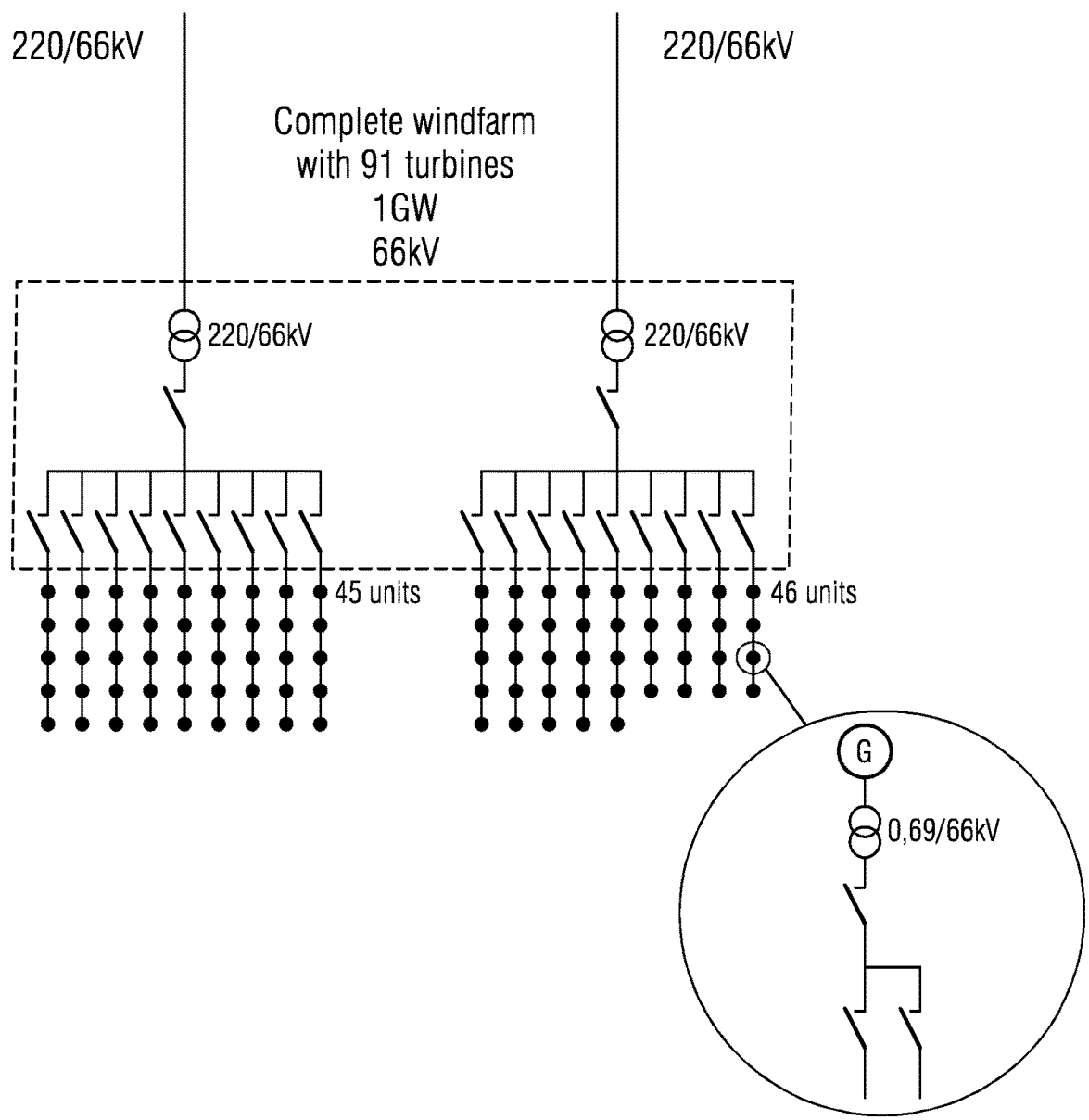
FIG. 3 shows another design not covered by embodiments of the invention as it has a substation, wherein each intermediate turbine transforms power to a lower voltage level.
Figure 4:
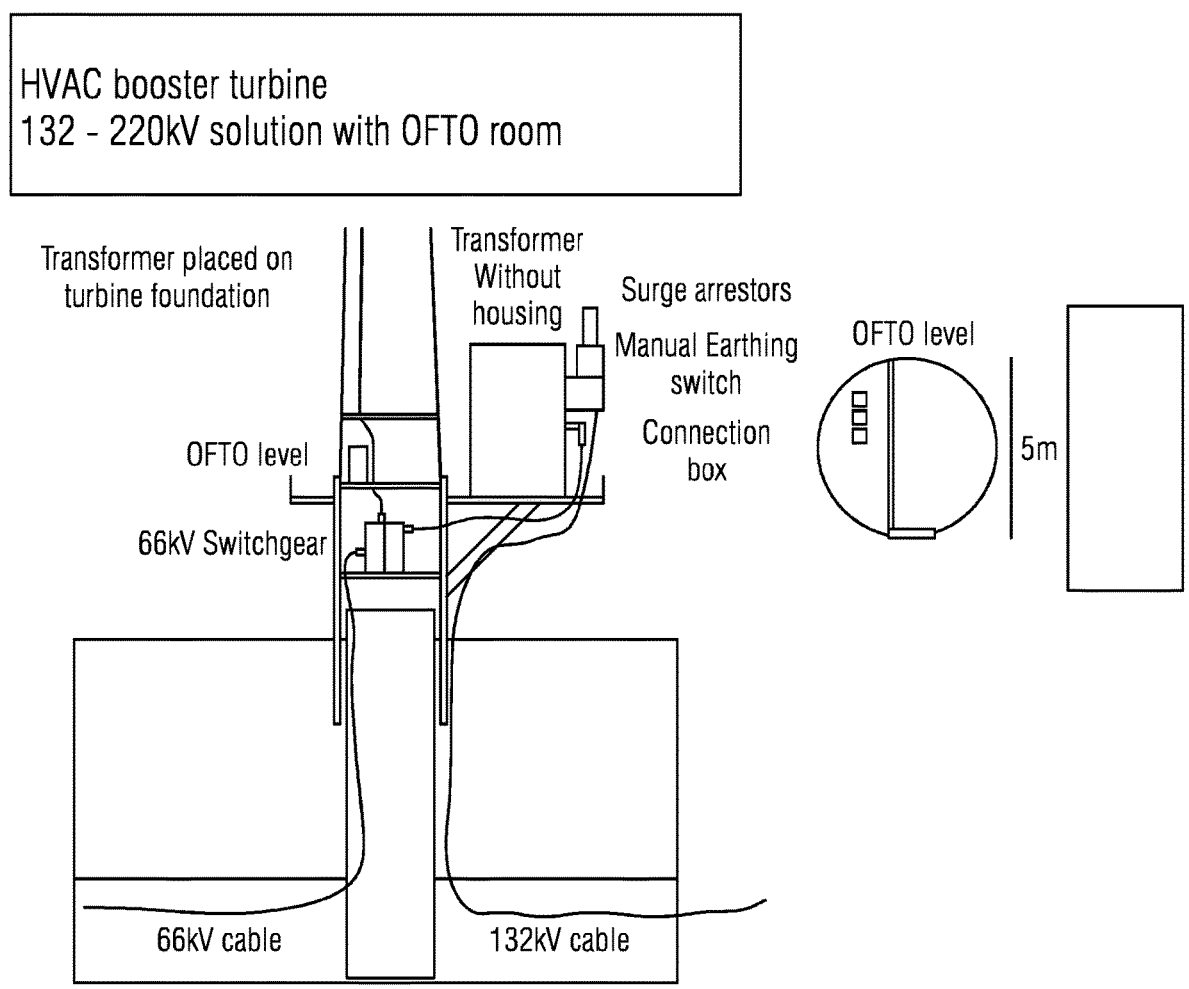
FIG. 4 shows cross sectional views from the side (left figure) and from the top (right figure) of a booster turbine, indicating the cabling at a booster turbine.

The following two figures FIGS. 2 and 3 do not explain embodiments of the invention but give reasoning about the solution of problems with a substation (the embodiments of invention are represented by FIG. 1 and FIG. 4 and higher).

FIG. 2 shows a design which is not covered by embodiments of the invention as it has a substation. The substation is indicated by dashed lines.

In the depicted example each of the intermediate wind turbines in one of the strings transforms right away to a higher voltage level (here: 132 kV). The cabling for the strings needs to cope with the higher power, particularly the closer the wind turbines get to the substation.

FIG. 2 shows a windfarm layout with 66 kV wind turbines, each wind turbine including a step up transformer stepping up the voltage to 132 kV. A switchgear with in- and outgoing 132 kV (A and B) connection is also shown for the individual wind turbine. Furthermore, a compensation reactor also connected with the 132 kV switchgear is shown. With this design the number of feeders (and strings) connected to the substation is eleven.

FIG. 3 shows a design which is not covered by embodiments of the invention as it has a substation. The substation is indicated by dashed lines.

In FIG. 3 each of the intermediate wind turbines remains at lower voltage level (here: 66 kV), but then the number of wind turbines should be maximally five (as an example) in string for the given example to be able to remain on the lower voltage level in the collected power of one string of wind turbines.

FIG. 3 shows a windfarm layout with 66 kV wind turbines without 132 kV step up transformers at the individual turbines. With this design the number of feeders (and strings) connected to the substation is nineteen in the present example. The disadvantage with this design is higher feeder losses. The feeders carry maximum current and the feeders from the most remote wind turbines are longer compared to the 132 kV array system.

The number of feeders approaching the substation may also exceed a predetermined maximum number. This may result in:

In case of installation of the substation, issues with access for jack up vessels to the substation due to cable "spaghetti".

In the design of the substation, lack of space for cable routing and J-tubes on the substation.

Thermal deration (derating) of the cables due to proximity.

Figure 6:
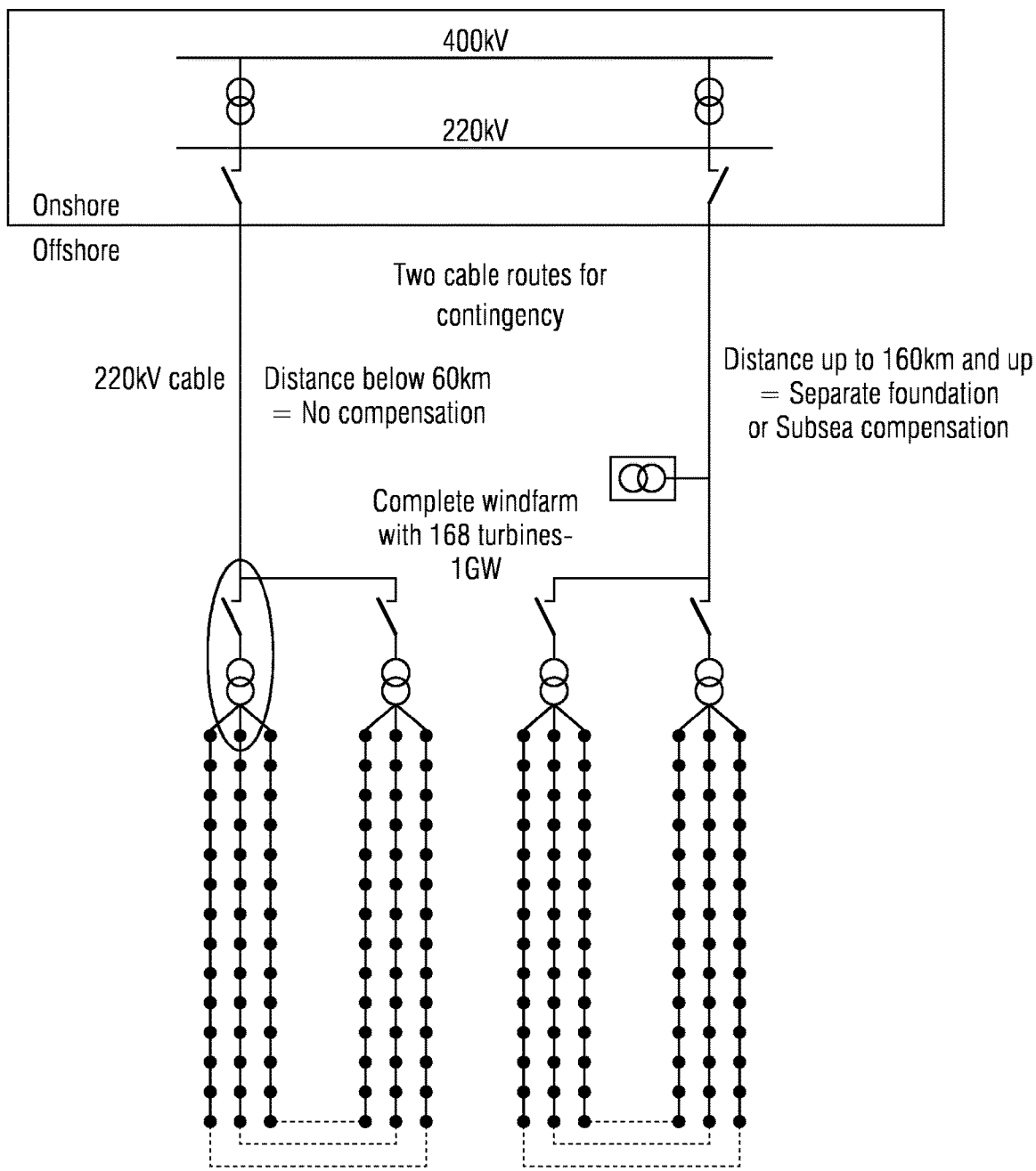
FIG. 6 illustrates a wind farm with a host turbine with step up transformer from 66 kV to 220 kV and an interconnection link, without having a substation.

The disadvantages of FIG. 2 and FIG. 3 are overcome by a design according to embodiments of the invention, as illustrated in FIG. 1, FIG. 4, and FIG. 6.

FIG. 4 shows cross sectional views from the side (left figure) and from the top (right figure) of a booster turbine, in particular indicating the cabling at a booster turbine.

"OFTO" stands for: Offshore Transmission Owner. OFTO may own the offshore transmission assets. As some of the HV equipment could be part of the transmission system, some space at the wind turbine needs to be made available for OFTO control equipment.

FIG. 4 shows a representation of a booster turbine which has input of 66 kV from at least one neighbouring first further wind turbine, wherein the input is guided to a 66 kV switchgear. 66 kV represents the first lower voltage level. From the switchgear a link is provided to a transformer. The switchgear and the transformer, as part of the electric assembly, are placed on platforms inside and/or outside the wind turbine tower (for example in or on a transition piece between a monopile and at least one other component of the wind turbine) and rest on the wind turbine foundation.

Another 66 kV input comes from the nacelle, where a power production component of the booster turbine is located, to the switchgear.

A transformer output, possibly routed through other equipment like surge arrestors, earthing component, etc., will then be guided via a 132 kV cable (or 220 kV) as an example for a second higher voltage level to the remote grid connection interface/connector, which is part of the second higher voltage level input and/or output interface.

Figure 5:
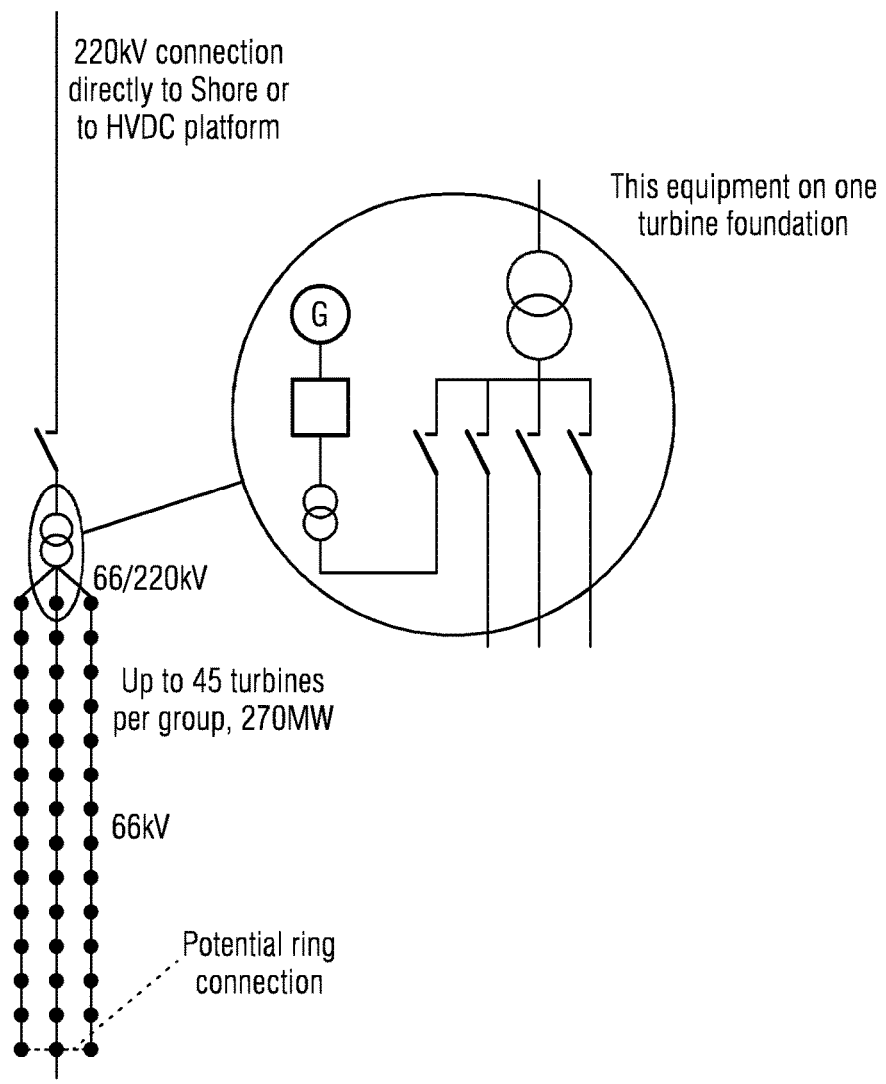
FIG. 5 illustrates a wind farm with a host turbine with step up transformer from 66 kV to 220 kV without having a substation.

FIG. 5 illustrates a wind farm with a host turbine (or booster turbine) with a step up transformer from 66 kV (first lower voltage level) to 220 kV (second higher voltage level) without having a substation.

FIG. 5 does not show the interconnection link between two booster turbines but otherwise represents embodiments of the invention as providing a direct link from the booster turbine to the grid connection.

This figure shows a host turbine with step up transformer from 66 kV to 220 kV. No 220 kV interconnection link to other host (=booster) turbine is shown. The host turbine provides switchgear to connect tree strings of wind turbines (as an example) and power from the generator of the host turbine itself.

Also, a potential ring connection is illustrated optionally connecting two strings of turbines at the other end of the string of turbines.

FIG. 6 illustrates a wind farm with a booster turbine with step up transformer from 66 kV to 220 kV and an interconnection link, without having a substation. This illustrates the inventive idea with interconnection between booster turbines. The combined power signal is then guided via a 220 kV export cable as an example for a higher voltage level to the remote grid connection interface.

This FIG. 6 shows a booster turbine with step up transformer from 66 kV to 220 kV. A 220 kV interconnection link to at least one other booster turbine is shown. This will allow more booster turbines to connect to each 220 kV export cable (two export cables are illustrated as an example, each export cable connected to two booster turbines and each booster turbine having three strings of wind turbines providing power to the booster turbines for further transmission to the onshore power grid, without using a substation).

A 66 kV loop connection is indicated as well. It is not relevant in relation to the core of embodiments of the invention.

In some embodiments, there could be a compensation equipment (see export cable in FIG. 6 on the right). The left cable is without compensation equipment.

Higher export cable voltage than 220 kV is possible, e.g., 275 kV. 275 kV is currently considered the highest reasonable voltage for 3-phase HVAC subsea cables.

The main advantage of embodiments of the invention is that a busbar and associated breakers are placed on a platform of one of the wind turbines. Thus, the wind turbine takes this functionality. No separate substation is used.

Figure 7:
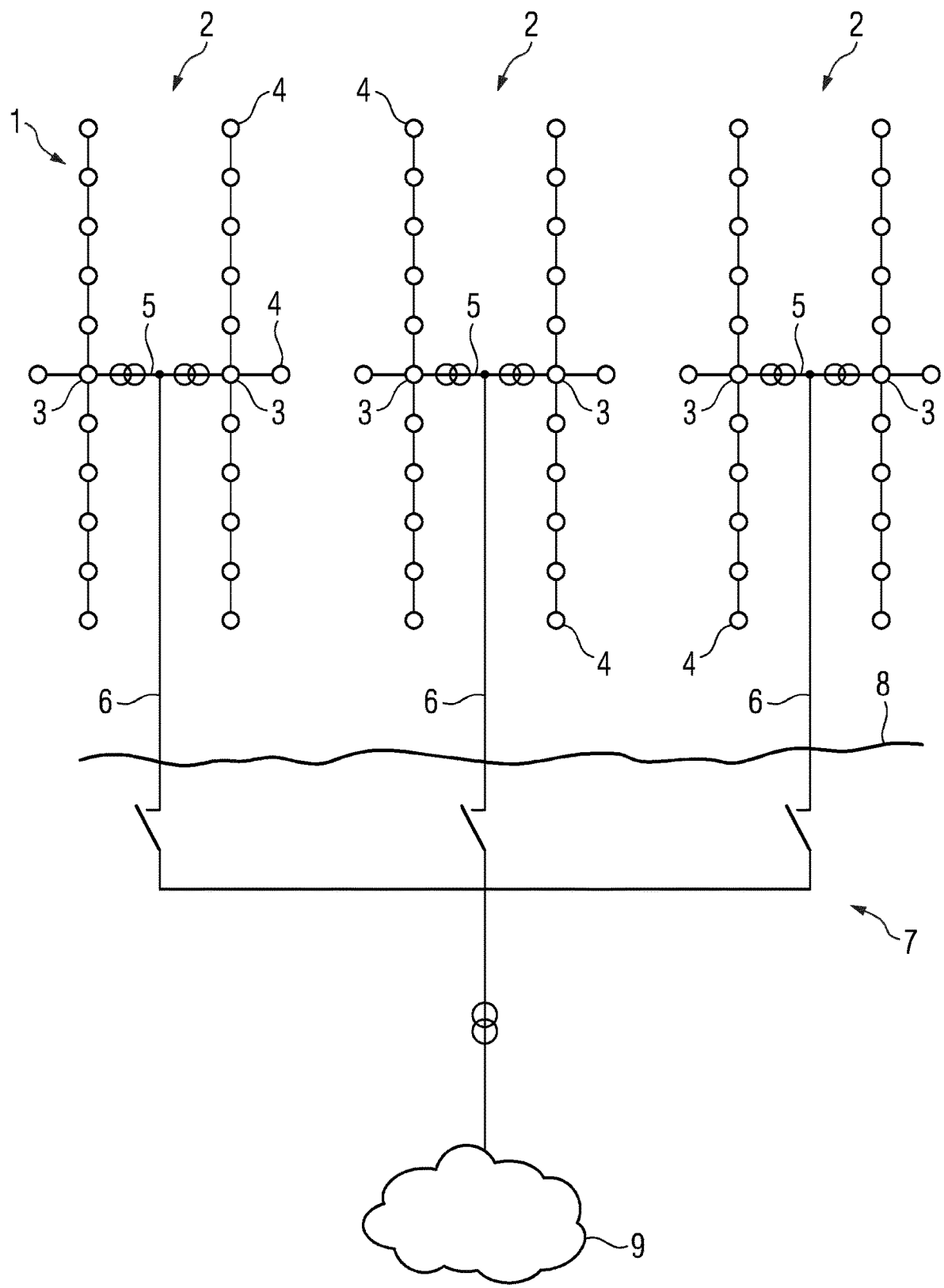
FIG. 7 shows a wind park according to an embodiment of the invention.

FIG. 7 shows a first embodiment of a wind farm 1, in particular comparable to that shown in FIG. 1.

The wind farm 1 comprises a total of seventy-two wind turbines, which are arranged in three sub-clusters 2. Each sub-cluster 2 comprises two interconnected wind turbines 3, which are configured as booster turbines. The remaining wind turbines 4 (first further wind turbines), in this case eleven first further wind turbines 4, are distributed into three strings of wind turbines 4, wherein two strings each comprise five first further wind turbines 4 and one string comprises only one first further wind turbine 4. In this case, the switchgear of the electric assembly of the booster turbines 3 comprises three first lower voltage level input interfaces for the three strings, wherein each of these interfaces has a maximum capacity matching a maximum number of five wind turbines 4 along a string. The first lower voltage level in this case is 66 kV, wherein, by the transformer of the electric assembly in the booster turbines 3, the voltage level is stepped up to a second higher voltage level of, in this case, 275 kV. While the detailed structure is not shown in FIG. 1, the interconnection links 5 between booster turbines as well as three export cables 6 are clearly indicated. The export cables 6 lead to an onshore power grid connection point, see shoreline 8, where, for example in an onshore substation, further switch gear and/or HV gear, for example at least one transformer, may be provided. In an example, using an additional step-up transformer, the voltage can be further increased from the second higher voltage level of 275 kV to 400 kV in the power grid indicated at reference numeral 9.

Figure 8:
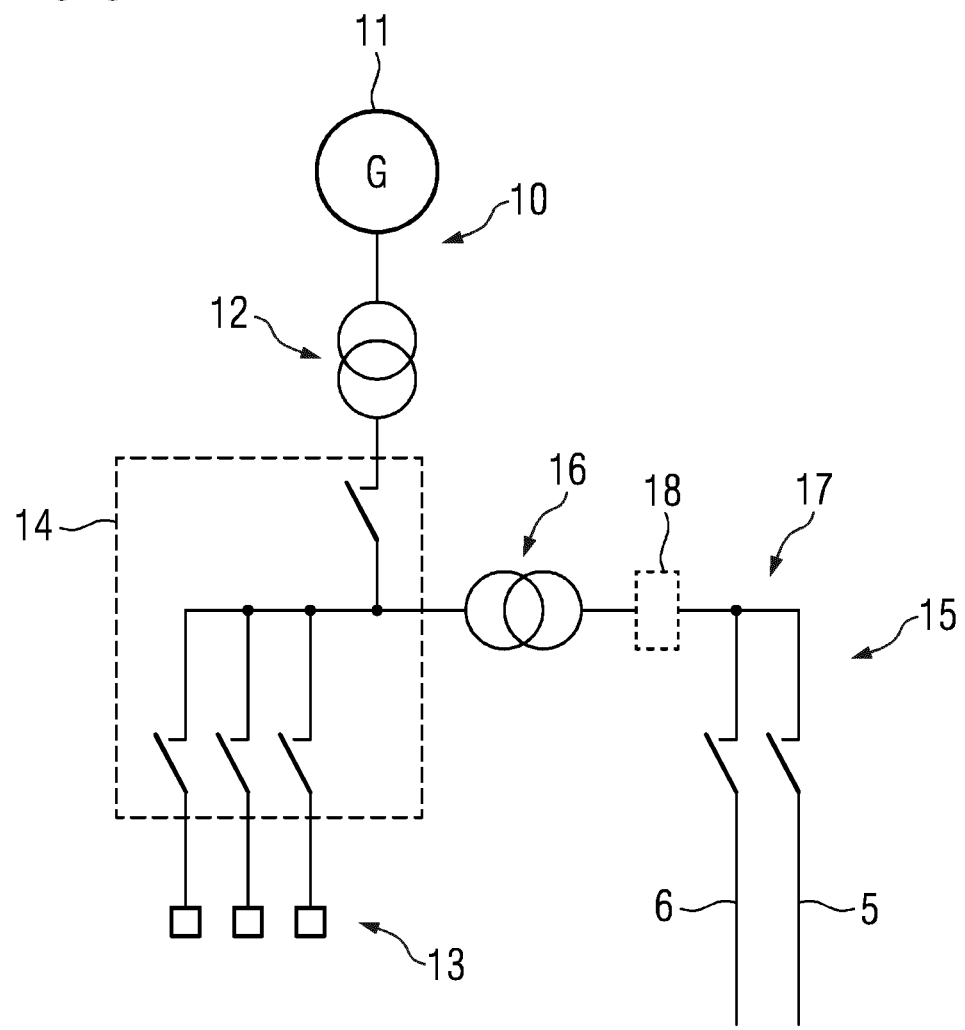
FIG. 8 shows the diagram of electric components and links in a booster turbine.

FIG. 8 shows a schematical circuit diagram of the booster turbines 3. Each booster turbine 3 still functions as a normal wind turbine, comprising its own power production component 10. The power production component 10 comprises a generator 11 of the wind turbine, wherein the output power of the generator 11 may be transformed to the first lower voltage level by a transformer assembly 12 (converter), which may, for example, be located in the nacelle atop the tower of the wind turbine 3, where also the generator 11 may be located. As known, the generator is connected to a rotor hub to which the blades of the wind turbine 3 are mounted, such that the generator 11 converts mechanical energy produced by wind impinging on the blades into corresponding electric power.

However, on the first lower voltage level, also the first further wind turbines 4, in particular as the three strings, are connected to the booster turbine 3 via, in this case, three first lower voltage level input interfaces 13 connecting to a switch gear 14 of an electric assembly 15 of the booster turbines 3. The switch gear 14 collects the respective power inputs at the first lower voltage level, in this case 66 kV, such that the collective electric power may be fed to the primary side of a transformer 16 of the electric assembly 15, which transforms the collective power from the switch gear 14 to a second higher voltage level, in this case 275 kV. A second higher voltage level input and/or output interface 17 provides connectors for the interconnection link 5 and the export cable 6, wherein, of course, not every booster turbine 3 needs to be directly connected to the export cables 6, as seen from FIG. 1, since it can, due to the concept described herein, also be connected indirectly via another booster turbine 3 of the respective sub-cluster 2, to which it is connected via the interconnection link 5.

The electric assembly 15 may further comprise optional components 18, for example compensation equipment and/or at least one surge arrester and/or at least one earthing component.

Figure 9:
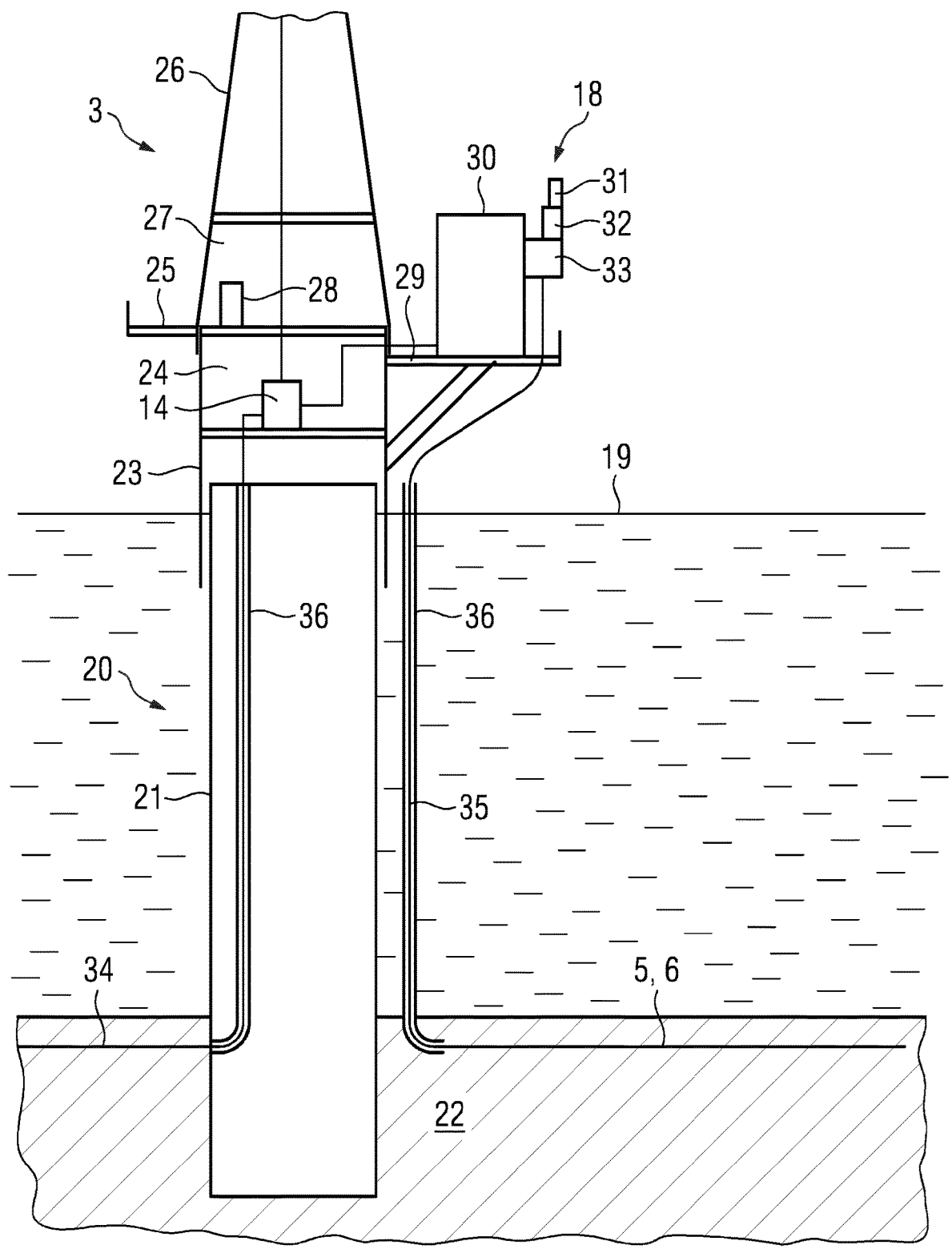
FIG. 9 shows a cross sectional view of a booster turbine.

FIG. 9 shows a schematical cross-section of the lower part of a wind turbine 3 configured as a booster turbine. As can be seen, to place the tower and further components of the wind turbine 3 above sea level 19, the wind turbine 3 comprises a foundation 20. In the shown example, the foundation 20 comprises a monopile 21 rooted in the seafloor 22, onto which a transition piece 23 is placed. The transition piece comprises an inner chamber 24, in which the switchgear 14 of the electric assembly 15 is located. To the transition piece 23, a boarding platform 25 and the tower 26 are mounted. In this case, the lowest floor of the tower 26 also comprises an OFTO room 27, in which OFTO control equipment 28 can be placed.

Furthermore, an additional, electric equipment platform 27 is mounted to the transition piece 23, wherein the transformer 16, in FIG. 9 only indicated by its housing 30, is placed on the additional platform 29. In embodiments, it may also be conceivable to use a transformer 16 without housing, for example only having an associated cover. Furthermore, surge arresters 31, earthing components 32, in particular a manual earthing switch, and compensation equipment 33 are indicated as optional components 18, wherein the compensation equipment 33 may, for example, be connected at the respective end of the export cable.

Since multiple booster turbines 3 are used for each sub-cluster 2 and a limited number of first further wind turbines 4 is connected to each of the booster turbines 3, the foundation 20 is not overloaded by the additional electric assembly 15 and a substation can be completely omitted.

Furthermore, the number of incoming and outgoing cables to and from a booster turbine 3 is limited. In the shown embodiment, since only three first lower voltage level input interfaces 13 are provided, three incoming first lower voltage level cables 34 to the switch gear 14 exist, wherein only one is shown for simplicity. As only a limited number of first further wind turbines 4 can be connected in each string, the capacity of the cables 34 can be limited and the cables can be simple, cheap, lightweight and of a small size.

Furthermore, only two second higher voltage level cables 35 are connected to the booster turbine 3 in this embodiment, namely for one of the booster turbines 3 in each sub-cluster 2 the respective export cable 6 and for both booster turbines 3 of each sub-cluster 2 their interconnection link 5, which thus connects the wind turbine 3 configured as a booster turbine to the other booster turbine 3 of the sub-cluster 2 as a second further wind turbine 3 on the second higher voltage level. For simplicity, only one second higher voltage level cable 35 is shown.

Since only a few cables need to be connected to the electric assembly 15, these cables 34, 35 can be conveniently guided by J-tubes 36, which can be formed as an integral part of the monopile 21 or attached or mounted to the monopile 21. An internal J-tube 36 is shown for the cable 34, an external, attached J-tube 36 is shown exemplarily for the cable 35. However, in practice, usually all J-tubes 36 will be implemented inside the monopile 21 or outside, attached to the monopile 21, wherein for the cables 34, the integrated J-tube 36 leads them right into the transition piece 23 and its interior chamber 24, where the switch gear 14 is located.

Figure 10:
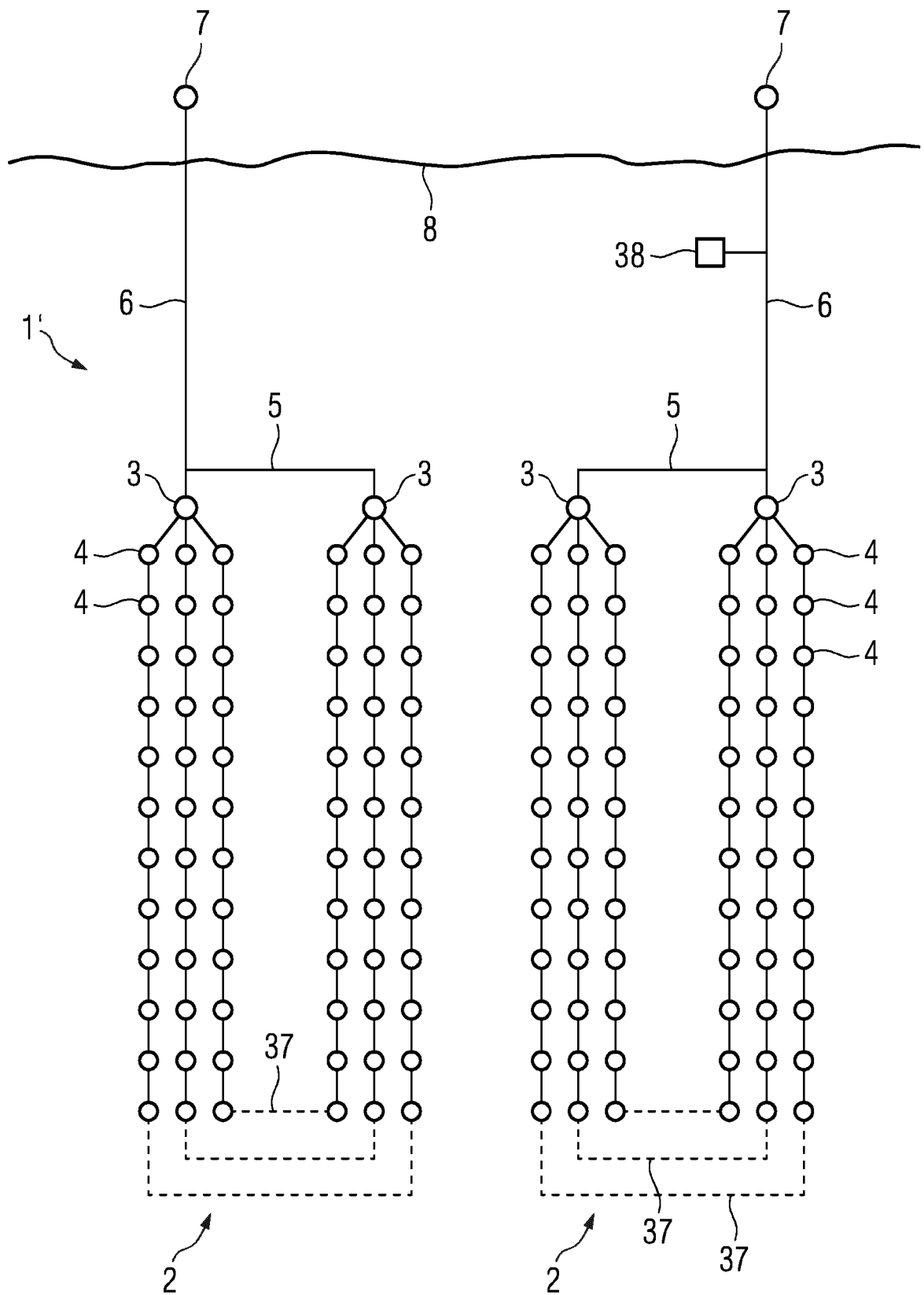
FIG. 10 shows a wind park according to an embodiment of the invention and its connection to a power grid.

FIG. 10 shows another example of a wind park 1' according to embodiments of the invention. In this example, two sub-clusters 2 are defined, each having two subgroups of forty-two wind turbines 4 organized as three strings each having fourteen first further wind turbines 4 to be connected to a respective one of two wind turbines 3 configured as a booster turbines per sub-cluster. In this case, the strings of each sub-cluster 2 are also connected by loop connections 37. Such a loop connection 37 allows to communicate with wind turbines 4 in a loop connected string and keep them energized even if one of the respective array cables, which also contain communication links, breaks, and further may even allow using produced power of such disconnected wind turbines 4, in particular during lower wind speed conditions.

The two booster turbines 3 of each sub-cluster 2 are, again, connected by an interconnection link 5 on the second higher voltage level and each sub-cluster 2 is connected to an export cable 6 via the booster turbines 3. It is noted that, of course, a sub-cluster may have more than two booster turbines 3, where expedient, for example if each string is limited to fewer first further wind turbines 4, for example five first further wind turbines 4.

In the embodiment of FIG. 10, comparable to the embodiment of FIG. 6, the two export cables 6 lead to different power grid connection points 7 onshore, as again indicated by the schematical shoreline 8. Since the export cable 6 shown on the right is a longer than the export cable 6 shown to the left, export cable compensation equipment 38 is provided along a path of the right export cable 6.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A booster wind turbine comprising:
   a power production component including at least a generator of the booster wind turbine;
   an electric assembly for electrically connecting the power production component and at least one first further wind turbine to an electric export cable, which is connectable or connected to a power grid, such that the electric assembly configures the wind turbine as the booster wind turbine,
   wherein the booster wind turbine is linked to a second booster wind turbine,
   wherein the electric assembly comprises:
      a switchgear operated on a first lower voltage level for switching and collecting input power from the power production component and from the at least one first further wind turbine, providing collective power on a first lower voltage level;
      a transformer for transforming, from a primary side of the transformer, the collective power from the switchgear to a second higher voltage level of the export cable connected to a secondary side of the transformer, and
      a second higher voltage level input and/or output interface, located at the secondary side of the transformer and operating on the second higher voltage level, providing an interconnection link linking the booster wind turbine to the second booster wind turbine, wherein the second booster wind turbine is configured to receive and/or provide power via the interconnection link on the second higher voltage level, wherein the second booster wind turbine includes a second electric assembly having a second switchgear operated on the first lower voltage level for switching and collecting input power from a power production component of the second booster turbine and from at least one second further wind turbine.

2. The wind turbine according to claim 1, wherein the switchgear is configured to have up to three or up to four first lower voltage level input interfaces for connecting the at least one first further wind turbine.

3. The wind turbine according to claim 2, wherein each first lower voltage level input interface comprises an input capacity for connecting a predefined number of first further wind turbines to the first lower voltage level input interface.

4. The wind turbine according to claim 1, comprising a wind turbine foundation carrying the electric assembly.

5. The wind turbine according to claim 4, wherein the wind turbine foundation comprises a monopile, wherein at least one J-tube for cables connectable to the electric assembly are provided as a part of and/or in and/or at the monopile.

6. The wind turbine according to claim 4, wherein at least a part of the electric assembly, the transformer, is provided on a platform mounted to the monopile and/or a transition piece and/or a tower of the wind turbine, and/or that at least a part of the electric assembly, the switchgear, is provided in an inner chamber of the monopile and/or of the transition piece and/or of the tower of the wind turbine.

7. The wind turbine according to claim 1, wherein the electrical assembly further comprises compensation equipment at the second higher voltage level side of the electric assembly and/or at least one surge arrester and/or at least one earthing component connected between the secondary side of the transformer and the second higher voltage level input and/or output interface.

8. The wind turbine according to claim 1, wherein the first lower voltage level is 66 kV and the second higher voltage level is 132 kV or 220 kV or 275 kV; or the first lower voltage level is 132 kV and the second higher voltage level is 220 kV or 275 kV.

9. The wind turbine according to claim 1, wherein the power production component further comprises a transformer assembly to step up a generator voltage of the generator to the first lower voltage level.

10. A wind farm, comprising the booster wind turbine according to claim 1, the second booster wind turbine, the at least one first further wind turbine, and the at least one second further wind turbine.

11. The wind farm according to claim 10, wherein all wind turbines of the wind farm are divided into multiple sub-clusters, such that the booster turbines of each sub-cluster are interconnected by corresponding interconnection links and connected to a common export cable for the respective sub-cluster.

12. The wind farm according to claim 11, wherein at least one common export cable comprises export cable compensation equipment along its course and/or at least two common export cables are directed to different power grid connection points.

13. The wind farm according to claim 10, wherein for each subgroup of first further wind turbines connected to a common booster turbine, the first further wind turbines are split into multiple strings of first further wind turbines connected on the first lower voltage level, wherein each string comprises less than or equal to a predefined maximum number of first further wind turbines and is connected to a respective first lower voltage level input interface of the respective booster turbine.

14. A wind farm, comprising:
a first booster wind turbine connected to at least one first non-booster wind turbine, and
a second booster wind turbine connected to at least one second non-booster wind turbine,
wherein the first booster wind turbine is directly interconnected to the second booster wind turbine through an interconnection power link,
wherein the first booster wind turbine has a power production component including at least a generator of the first booster wind turbine, an electric assembly for electrically connecting the power production component and the at least one first non-booster wind turbine to an electric export cable, which is connectable or connected to a power grid, wherein the electric assembly includes:
a switchgear operated on a first lower voltage level for switching and collecting input power from the power production component and/or from the at least one first non-booster wind turbine, providing collective power on a first lower voltage level,
a transformer for transforming, from a primary side of the transformer, the collective power from the switchgear to a second higher voltage level of the export cable connected to a secondary side of the transformer, and
a second higher voltage level input and/or output interface, located at the secondary side of the transformer and operating on the second higher voltage level, wherein the second higher voltage level input and/or output interface provides the interconnection power link directly interconnecting the first booster wind turbine to the second booster wind turbine.

15. The wind farm according to claim 14, further comprising:
a first common export cable for the first booster wind turbine and the second booster wind turbine, wherein the first common export cable is connected to the interconnection power link.

16. The wind farm according to claim 15, further comprising:
a third booster wind turbine connected to at least one third non-booster wind turbine, and
a fourth booster wind turbine connected to at least one fourth non-booster wind turbine.

17. The wind farm according to claim 16, further comprising:
a second common export cable for the third booster wind turbine and the fourth booster wind turbine.

18. The wind farm according to claim 17, wherein at least one of the first common export cable and the second common export cable comprises export cable compensation equipment and/or wherein the first common export cable and the second common export cable are directed to different power grid connection points.

* * * * *